INVENTOR.
HAROLD W. HALVORSEN

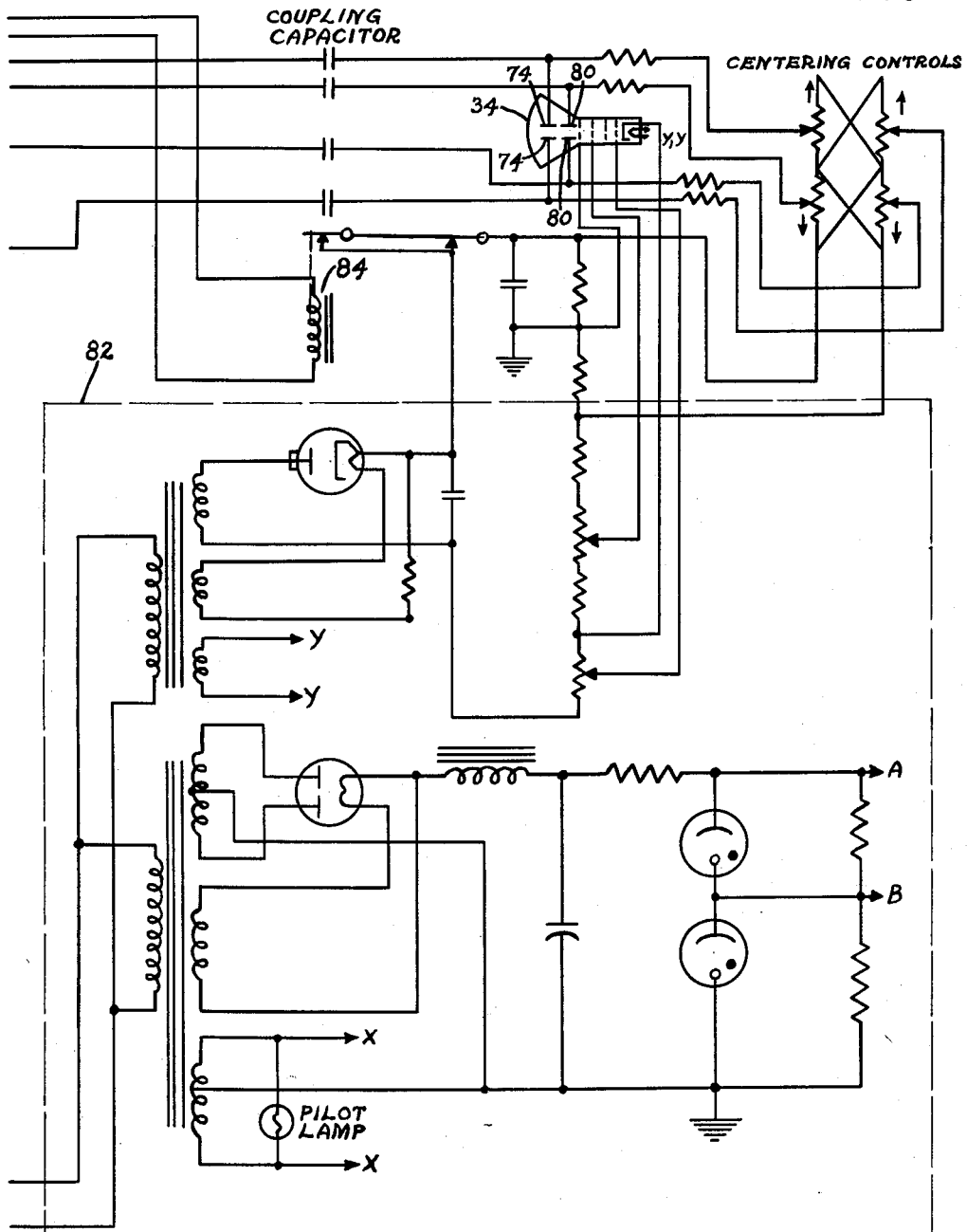

United States Patent Office 3,075,300
Patented Jan. 29, 1963

3,075,300
POSITION INDICATOR AND COINCIDENCE
CIRCUIT
Harold W. Halvorsen, Silver Spring, Md., assignor, by mesne assignments, to the United States of America as represented by the Secretary of the Navy
Filed Oct. 16, 1959, Ser. No. 847,031
4 Claims. (Cl. 35—12)

This invention relates to instrument flying systems for aircraft and aircraft trainers and more particularly to improvements in circuitry for presenting to the pilot the position of an aircraft in an airborne instrument flight system or in a ground based trainer.

The principal object of the present invention is to provide improved methods of and means for determining continuously the position of an aircraft with respect to a predetermined flight path, and providing visible indications thereof.

Another object is to provide a system of the described type wherein no complex equipment is required to be carried on the aircraft.

A further object is to provide an improved method for visual presentation of readily interpretable indications of an aircraft's position with respect to a predetermined flight path.

Another object is to provide a system of the described type for use in a ground based trainer.

Other objects and many of the attendant advantages of this invention will be readily appreciated as the same becomes better understood by reference to the following detailed description when considered in connection with the accompanying drawing which is a detailed block and schematic diagram of the circuitry of the instant invention.

Figure 1A:
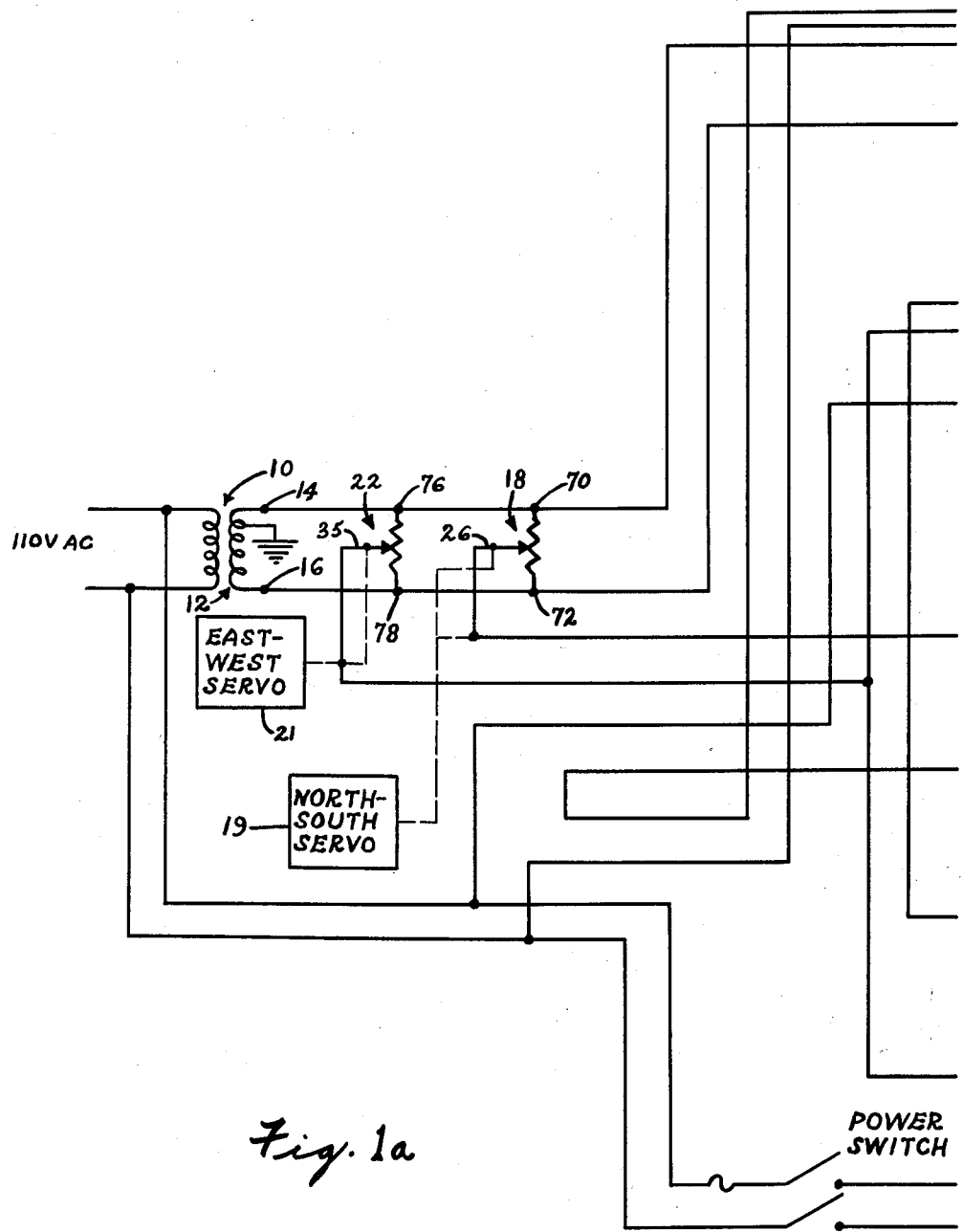
Figure 1B:
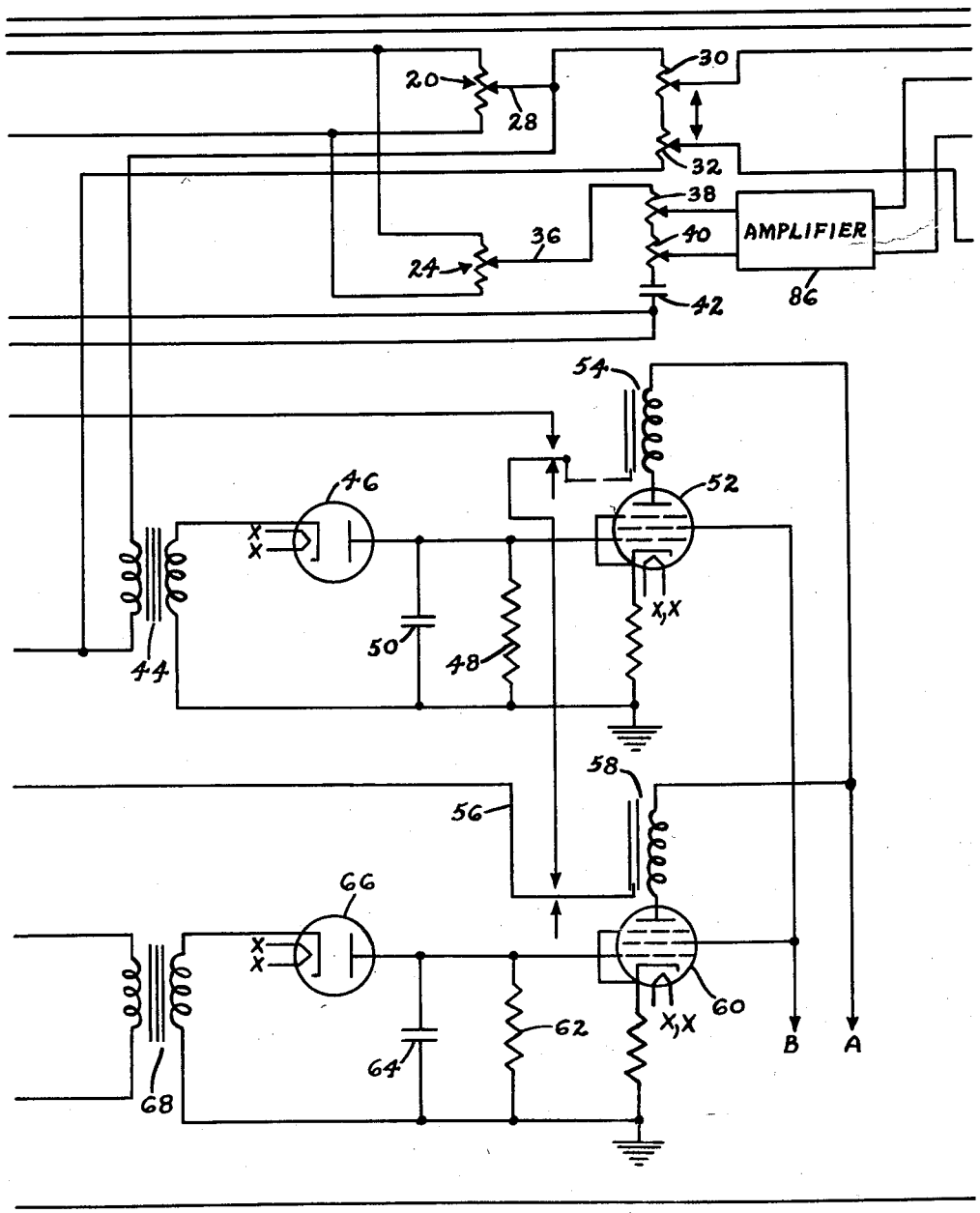

FIGURE 1a shows part of the north-south and east-west bridge circuits and the input position servos. FIG. 1b shows the bridge circuits and coincidence circuitry. FIG. 1c shows the power supply and indcator circuits.

As shown in the FIGURE, alternating current power is applied to the tran.former 10. This transformer has a center-tapped secondary winding 12 and provides the voltages 14 and 16 at the ends of secondary winding 12 which are 180° out of phase with each other. Voltage 14 is denoted as phase 1 and the voltage 16 is denoted as phase 2. Phase one is respectively applied to one end of each of variable resistors 18, 20, 22 and 24. Phase 2 is respectively applied to the other ends of variable resistors 18, 20, 22 and 24. Variable resistors 18 and 20 form a north-south bridge circuit with the resistance on each side of the movable contact 26 and 28 respectively representing one arm of the bridge. Ganged volume control potentiometers 30 and 32 are connected in series between the movable arms 26 and 28 of this north-south bridge circuit.

The output from the movable arms of volume control potentiometers 30 and 32 are respectively applied to the north-south deflection plates of cathode ray tube 34.

Variable resistors 22 and 24 form an east-west bridge circuit with the resistance on each side of the movable contacts 35 and 36 respectively representing one arm of the bridge. Ganged volume control potentiometers 38 and 40 and phase shifting capacitor 42 are connected in series between the movable arms 35 and 36 of the east-west bridge circuit.

The outputs from the movable arms of volume control potentiometers 22 and 24 are respectively applied to the east-west deflecting plates of the cathode ray tube 34.

The voltage across the north-south volume control potentiometers is applied through transformer 44 and diode 46 to the grid resistor and grid capacitor 50 for the north-south pentode relay control tube 52. This relay control tube 52 controls the coincidence relay 54. The coincidence signal 56 is generated when both the north-south coincidence relay 54 and the east-west coincidence relay 58 are actuated. The east-west coincidence relay 58 is controlled by the east-west pentode control tube 60. The input signal to pentode relay control tube 60 is applied to the grid resistor 62 and capacitor 64 through diode 66 and transformer 68. This signal is taken across the series combination of capacitor 42 and resistors 38 and 40.

In operation, single phase A.C. voltage is applied to the primary of transformer 10. The center-tapped secondary winding 12 of this transformer through normal transformer action supplies two voltages 14 and 16 which are 180° out of phase with each other with respect to ground.

The variable arm of north-south potentiometer 18 is actuated by the north-south servo shafts in the flight servo mechanism 19. Thus, the voltage on the variable arm of potentiometer 18 is the analog of the aircraft's north-south position.

The variable arm of the north-south set position potentiometer 20 is manually set to a point which represents a desired north-south coordinate. Due to the fact that both phases 1 and 2 are applied across the north-south bridge potentiometers 18 and 20, each potentiometer has a voltage gradient which varies from maximum phase 1 voltage at point 70 decreasing linearly to 0 at mid potentiometer range, then phase 2 voltage increasing linearly to maximum phase 2 voltage at point 72. When the position of the variable arm of potentiometer 18 is at a position which has the same phase and absolute voltage level to which potentiometer 20 had been set, the bridge is balanced. At this position, no voltage is developed across dual volume control potentiometers 30 and 32 and therefore no voltage is applied to the deflection plates 74 of cathode ray tube 34 or to transformer 44.

When the bridge is not balanced, a voltage is developed across volume control potentiometers 30 and 32 which is applied to deflection plates 74 of the cathode ray tube 34 and appears as a visible line. The length of this line is proportional to the vector sum of the voltages at the variable arms of potentiometers 20 and 26. Dual volume control potent'ometers 30 and 32 are adjusted to limit the amount of deflection voltage applied to plate 74.

The voltage potential across potentiometers 30 and 32 is also applied to transformer 44 for the coincidence relay function.

The variable arm of east-west potentiometer 22 is actuated by the east-west servo shafts (21) in the flight servo mechanism. Thus the voltage on the variable arm of potentiometer 22 is the analog of the aircraft's east-west position.

The variable arm of the east-west set position potentiometer 24 is manually set to a point which represents a desired east-west coordinate. Now since both phase 1 and phase 2 are applied across the east-west bridge potentiometers 22 and 24, each potentiometer has a voltage gradient which varies from phase 1 voltage at point 76 decreasing linearly to 0 at mid potentiometer range, then phase 2 voltage increasing linearly to maximum phase 2 voltage at point 78. When the position of the variable arm of potentiometer 22 is at a position which has the same phase and absolute voltage level to which potentiometer 24 had been set, the bridge is balanced. At this position, no voltage is developed across the series combination of capacitor 42 and dual volume control potentiometers 38 and 40, and therefore no voltage is applied to the deflection plates 80 of cathode ray tube 34.

When the bridge is not balanced, a voltage is developed across capacitor 42 and potentiometers 38 and 40 which is applied to deflection plates 80 of cathode ray tube 34 and appears as a visible trace on the screen of the cathode ray tube. The capacitor 42 causes a phase shift in the voltage developed across potentiometers 38 and 40. The phase shift capacitor 42 is selected so that its capacitive reactance $X_c$, is much larger than the resistance of potentiometers 38 and 40. This results in a phase shift which is approximately 90 degrees.

The combined effect of the deflection voltages approximately 90 degrees out of phase, which are respectively applied to one set of deflecting plates of the cathode ray tube is to form an ellipse on the screen of the cathode ray tube 34. The major axis of the ellipse will be either vertical or horizontal.

It then becomes a simple matter for a pilot or trainee to fly the aircraft or simulator to the north-south and east-west coordinate set on potentiometers 20 and 24. This is accomplished by observing the ellipsodal display on the face of cathode ray tube 34 and flying the aircraft or simulator in such a direction that the minor axis of the ellipse observed becomes small, until it dwindles to zero, i.e., until a vertical line is observed. Then the pilot would control the direction of the aircraft to maintain the display as a vertical line becoming smaller. When the vertical line approaches zero, the pattern becomes a dot and the pilot or trainee has reached the desired coordinate.

When the desired coordinates are reached, a coincidence signal is generated which blanks out the screen of the cathode ray tube 34. This coincidence signal is generated by the north-south and east-west coincidence relays 54 and 58. The operation of the north-south and east-west coincidence relays is identical except that both relays are in series so that a coincidence signal is generated only when both relays are operated.

Only the operation of the north-south coincidence relay will be explained infra. Coincidence relay 54 which connects the coincidence signal to the east-west coincidence relay 58 is controlled by north-south pentode relay control tube 52. With this control tube 52 not conducting, the relay 54 is deenergized and there is no coincidence signal output. The control tube 52 is held in a nonconducting condition although its grid is connected to ground through the parallel combination of a grid-leak resistor 48 and capacitor 50, by a negative D.C. voltage from diode 46. This negative D.C. voltage is the half wave rectified output of transformer 44. This transformer 44 is a relatively high impedance load across the bridge formed by potentiometers 18 and 20 and does not appreciably affect the voltages and currents involved. When the variable arm of potentiometer 18 reaches a position which is the same absolute magnitude and phase as the variable arm of potentiometer 20, the voltage across the bridge formed by these two potentiometers 18 and 20 becomes zero. The output of transformer 44 then becomes zero. The D.C. voltage holding the relay control tube 52 in a non-conducting condition becomes zero and this tube conducts, operating coincidence relay 54. An exactly similar relay control circuit is placed across the bridge formed by potentiometers 22 and 24. This coincidence relay 58 is in series with coincidence relay 54 so that only when both bridge voltages approach zero do both relays close at the same time and supply a coincidence signal.

The high voltage and filament voltage circuits 82 are shown on the figure in detail. These circuits are conventional and are in current use with television receivers and therefore need not be further explained.

A coincidence relay 84 is connected between the high voltage and the deflection plates of the cathode ray tube 34. When the north-south relay 54 and east-west relay 58 are operated, a coincidence signal is supplied to relay 84, operating this relay and thereby opening the contacts of this relay, removing the high voltage from the cathode ray tube 34 and blanking the visual presentation.

Amplifier 86 is inserted between the output of the east-west bridge circuit and deflection plates 80. This amplifier provides extra gain to compensate for the loss due to phase shifting capacitor 42.

Obviously many modifications and variations of the present invention are possible in the light of the above teachings. It is therefore to be understood that within the scope of the appended claims the invention may be practiced otherwise than as specifically described.

What is claimed is:

1. In an aircraft training device, an instrument flying system comprising a first bridge circuit and a second bridge circuit, a source of current operatively connected to said first and second bridge circuits whereby said first and second bridge circuits generate output signals, means for controlling the output signals from said first and second bridge circuits in accordance with the aircraft's simulated position, an indicator operatively connected to said first and second bridge circuits whereby the aircraft's position data is presented, the output from said first bridge circuit being the analog of the aircraft's present north-south position relative to a preset north-south point, the output from said second bridge circuit being the analog of the aircraft's present east-west position relative to a preset east-west point, wherein said first bridge circuit comprises two variable potentiometers operatively connected in parallel, the output from said first bridge circuit being a potential across a resistance, said resistance being operatively connected between the arms of said variable first bride potentiometers and said indicator, and said second bridge circuit comprises two variable potentiometers operatively connected in parallel, and means for phase shifting the output from said second bridge circuit to produce an elliptical display upon said indicator, said phase shifting means being operatively connected between said second bridge circuit and said indicator, whereby said phase shifted second bridge circuit output is operatively connected between the arms of said variable second bridge potentiometers and said indicator.

2. The combination of claim 1 and means for deriving potentials from said current source, wherein said indicator is a cathode ray tube and said potential means are operatively connected to said indicator.

3. The combination of claim 2 and blanking means, said blanking means being operatively connected to said first and second bridge circuits and said indicator, whereby said indicator presentation is blanked out by said blanking means at preset coordinate points.

4. The combination of claim 3 and an amplifier, said amplifier operatively connected between said second bridge circuit output and said indicator to compensate for losses in the phase shifting means.

References Cited in the file of this patent

UNITED STATES PATENTS

| | | |
|---|---|---|
| 2,475,600 | Eytinge | July 12, 1949 |
| 2,532,549 | Higinbotham et al. | Dec. 5, 1950 |
| 2,541,277 | Omberg et al. | Feb. 13, 1951 |
| 2,733,436 | Doba et al. | Jan. 31, 1956 |
| 2,878,585 | Steiner | Mar. 24, 1959 |
| 2,951,297 | Colker | Sept. 6, 1960 |